United States Patent [19]

Tsutsumikoshi

[11] Patent Number: 4,788,888
[45] Date of Patent: Dec. 6, 1988

[54] TWO-AND-FOUR-WHEEL DRIVE SHIFTING SYSTEM

[75] Inventor: Shinobu Tsutsumikoshi, Hamamatsu, Japan

[73] Assignee: Suzuki Motor Company Limited, Shizuoka, Japan

[21] Appl. No.: 135,526

[22] Filed: Dec. 17, 1987

Related U.S. Application Data

[63] Continuation of Ser. No. 764,580, Aug. 12, 1985, abandoned.

[30] Foreign Application Priority Data

Jan. 30, 1985 [JP] Japan .................................. 60-16060

[51] Int. Cl.$^4$ ............................................. F16H 1/44
[52] U.S. Cl. .................................... 74/710.5; 74/713; 180/250
[58] Field of Search ...................... 74/694, 710.5, 713, 74/710; 180/247, 248, 250, 249

[56] References Cited

U.S. PATENT DOCUMENTS

| | | | |
|---|---|---|---|
| 1,033,083 | 7/1912 | Collins | 74/713 X |
| 1,033,084 | 7/1912 | Collins | 74/713 X |
| 1,165,915 | 12/1915 | Sparks | 74/713 X |
| 1,332,535 | 3/1920 | Baker | 74/713 |
| 1,351,942 | 9/1920 | Chapron | 74/710.5 |
| 3,146,842 | 9/1964 | Nelson et al. | 74/710.5 |
| 3,973,450 | 8/1976 | Shealy | 74/710.5 |
| 4,271,722 | 6/1981 | Campbell | 74/713 |
| 4,281,735 | 8/1981 | Sloma | 180/247 |
| 4,304,317 | 12/1981 | Vanzant et al. | 74/713 X |
| 4,467,672 | 8/1984 | Lamy | 74/713 |
| 4,526,063 | 7/1985 | Oster | 74/710.5 |

FOREIGN PATENT DOCUMENTS

| | | | |
|---|---|---|---|
| 653814 | 11/1937 | Fed. Rep. of Germany | 74/694 |
| 659561 | 4/1938 | Fed. Rep. of Germany | 74/694 |
| 143062 | 7/1980 | Fed. Rep. of Germany | 180/250 |
| 3325485 | 11/1984 | Fed. Rep. of Germany | 74/710.5 |

Primary Examiner—Leslie A. Braun
Assistant Examiner—David Novais
Attorney, Agent, or Firm—Birch, Stewart, Kolasch & Birch

[57] ABSTRACT

A two-and-four-wheel drive shifting system of the type not including a differential gear unit comprises a pair of output shafts extending opposedly from each other and mounted rotatably independently of each other, an input member mounted concentrically and rotatably on one end of one of the pair of output shafts, and a sliding clutch mounted operatively on the other of the pair of output shafts. The sliding clutch having an engagement claw adapted to commonly engage with claws provided on one output shaft and on an input member in such a manner that the sliding clutch may be shifted in sliding motion in the axial direction along the other output shaft so as to selectively engage and disengage with either of the output shafts and the input member so that either the two-wheel or four-wheel drive position can be selected. A second embodiment provides a two-and-four wheel drive shifting system of the type including a differential gear unit, comprising a pair of output shafts extending opposedly from each other and mounted rotatably independently of each other, a differential gear unit disposed intermediate the pair of output shafts, an input gear mounted concentrically and rotatably on a gear casing of the differential gear unit, and a sliding clutch mounted slidably and rotatably on one of the pair of output shafts. The sliding clutch having an engagement claw adapted to commonly engage with claws provided on the differential gear casing and on the input gear in such a manner that the sliding clutch may be shifted in sliding motion in the axial direction along the one output shaft so as to engage and disengage with the claws on the differential gear casing and the input gear so that either of two-wheel or four-wheel drive position can be selected.

2 Claims, 5 Drawing Sheets

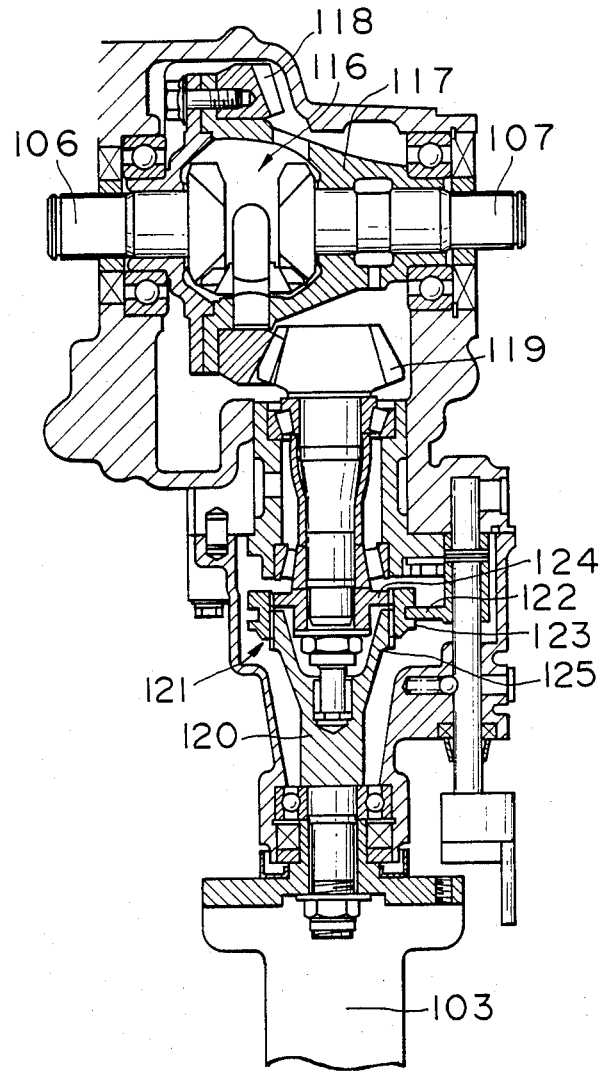

TWO-AND-FOUR-WHEEL DRIVE SHIFTING SYSTEM

This application is a continuation of application Ser. No. 764,580, filed on Aug. 12, 1985, abandoned.

BACKGROUND OF THE INVENTION

1. Field of the Invention

The present invention relates to an improvement in or relating to a drive shifting system for use with an automotive vehicle, and more particularly to an improved drive shifting system for shifting the drive position between two and four wheel drive which is specifically designed to be compact and light weight so that it can be adapted to a light-weight automotive vehicle.

2. Description of the Prior Art

It is generally known that the four-wheel drive system has been extensively employed in automotive vehicles used for specific purposes such as a jeep, a saddle-riding type off-road vehicle, a special service vehicle for carrying heavy loads, a truck for towing a trailer, and the like.

There is shown, in general view and schematic view, a typical four-wheeled light saddle-type vehicle for off-road or irregular field services and a general power line lay-out thereof in FIGS. 4 and 5, respectively.

A typical four-wheel drive system for use with a four-wheeled saddle-type vehicle for irregular field services is designated generally by the reference numeral 100. There is provided a pair of front wheels designated at 101 and a pair of rear wheels at 102, a propeller shaft at 103 and an internal combustion engine at 104, the propeller shaft 103 being adapted to transmit the driving power generated from the engine 104 to the front wheels 101, and connected operatively through a differential gear unit designated at 105 to front drive axles at 106 and 107 which mount rotatably the right and left front wheels, respectively.

Also, FIG. 6 is a general cross-sectional view showing the typical general arrangement of a conventional drive shifting system for shifting the power trains or driving positions from a two-wheel set to a four-wheel set, and vice-versa of a vehicle, which is mounted operatively in the differential gear unit 105, wherein there is shown a small reduction gear 108 to which the driving power from the engine 104 is transmitted by the propeller shaft 103, a large reduction gear 109 mounted on a drive sleeve 110 which is held rotatably by one driving axle 106, and a driving wheel 111 spline-connected upon the driving axle 106, in which a plurality of openings 112 are formed at a predetermined space from each other in the circumference of the plate portion of the driving wheel. There are also provided a plurality of claws or dogs 113 on the other driving axle 107, which are disposed in an opposed operative relationship with the plurality of openings 112 formed in the driving wheel 111. A sliding wheel at 114 is spline-connected upon the drive sleeve 110, and is provided with a plurality of claws or dogs 115 disposed in an opposed operative relationship with the plurality of openings 112 formed in the driving wheel 111.

According to such a typical construction of the conventional two-and-four-wheel drive shifting system as noted above, when the normal two-wheel drive of a vehicle is desired, it is generally arranged that the driving power from the engine 104 is shifted to a drive position for driving the rear axle so that the pair of rear wheels 102 are driven in rotating motion. At the same time, the small reduction gear 108 is driven in rotation from the rotation of the propeller shaft 103 via the transmission means incorporated in the vehicle, thus causing the large reduction gear 109 to be driven in rotation. Then, the large reduction gear 109 is driven to rotate with the drive sleeve 110, which would then cause the sliding wheel 114 to be driven in rotation. At this moment, since the sliding wheel 114 is still disconnected from the driving wheel 111 and the dogs 113, both the left and right front drive axles 106, 107 are free from the driving position so that the front wheels 101 may rotate only because of the tractive motion of the rear wheels 102, thus providing the two-wheel drive of a vehicle, accordingly.

Next, when the four-wheel drive is desired by a driver of the vehicle, it requires a shifting motion of a drive shift lever at the driver's seat, not shown, to the four-wheel drive position so that the sliding wheel 114 may be caused to shift in the axial direction shown by an arrow in FIG. 6 by function of a drive shift fork, not shown. The sliding wheel 114 is then caused to engage operatively with the driving wheel 111 with its dogs 115 inserted into the openings 112 in the wheel 111 to such an extent that these dogs 115 may engage mutually with the driving dogs 113 on the part of the front drive axle 107. With this engagement, when the driving wheel 111 is driven in rotation, the front drive axle 106 may now be rotated together with the other drive axle 107. Now, the pair of front wheels 101 are caused to be driven in rotation with the power transmission from the engine, whereby the saddle-type off-road vehicle 100 can then be put in the four-wheel drive position, accordingly.

In accordance with the typical construction of the two-and-four-wheel drive shifting system of the prior art, the sliding wheel 114 is kept in rotating motion even during the two-wheel driving operation thus, it is inevitable that the sliding wheel 114 may be subjected to possible damages, and also that the entire drive shifting system would tend to be cumbersome because of the relatively long extension of the sliding wheel 114.

On the other hand, there is also provided another type two-and-four wheel drive shifting system wherein there is employed a differential gear unit 116 between the front drive axles 106, 107 of the front wheels 101 as typically shown in FIG. 7, in which there is provided a large reduction gear 118 in a differential gear box 117. With this arrangement, there is provided a small reduction gear 119, which is adapted to drive the large reduction gear 118, and this small reduction gear 119 is connected operatively to a driving shaft 120 by way of a spline coupling 121, with the driving shaft 120 being driven in rotation from the propeller shaft 103. In this system construction, the spline coupling 121 is designed to connect and disconnect the small reduction gear 119 with the driving shaft 120 by the selective sliding motion of a movable spline element 123, which is adapted to move in sliding motion by function of a fork 122 between the engagement positions with splines 124 and 125 provided in the small reduction gear 119 and the driving shaft 120, respectively.

According to such a typical construction in a conventional two-and-four wheel drive shifting system, it is generally arranged that for the two-wheel drive of the vehicle the movement of the fork 122 will cause the movable spline element 123 to disengage from the splines 124 which rotate the small reduction gear 119.

With this shifting action, both the left and right front wheels 101 are put into a coupling arrangement with each other through the differential gear unit 116 for the normal running operation of the vehicle.

Next, when the four-wheel drive of the vehicle is desired, the fork 122 is actuated so as to have the movable spline element 123 shifted in the longitudinal direction, thereby causing both the splines 124, 125 to be engaged with each other through the spline element 123. With this operation, it is seen that the driving power on the propeller shaft 103 is transmitted to the small reduction gear 119 through the driving shaft 120, then to the splines 125, an to the movable spline element 123 and then to the splines 124, thus having the differential gear box 117 driven in rotation by the rotating motion of the large reduction gear 118, and thus causing the both driving axles 106, 107 to be rotated through the planetary gears in the differential gear unit 116, accordingly.

In this type of four-wheel drive system, when it is required to have the differential gear unit 116 locked in its operative motion for attaining the effect of rigid axle, it is generally the practice to provide in addition a lock mechanism as typically shown in FIG. 6, which would result in a relatively large sized and complex construction of the entire drive shifting system.

In consideration of the drawbacks in the conventional construction of a two-and-four wheel drive shifting system as noted above, it would be desirable to attain an efficient resolution of the problems present in the conventional construction.

The present invention is essentially directed to the provision of a resolution of the problems as outlined above and experienced in the conventional two-and-four wheel drive shifting system which have not been properly solved.

SUMMARY OF THE INVENTION

It is therefore a primary object of the present invention to provide an improved two-and-four wheel drive shifting system for use with an automotive vehicle, which can effectively overcome such problems in the conventional design and construction with a relatively compact and light weight system.

The above object of the invention can be attained efficiently from an improved two-and-four wheel drive shifting system of the type not including a differential gear unit, which comprises, as summarized in brief, a pair of output shaft means extending opposedly from each other and mounted rotatably independently of each other, an input means mounted concentrically and rotatably on one end of one of the pair of output shaft means, and a sliding clutch means mounted operatively on the other of the pair of output shaft means, the sliding clutch means having engagement claw means adapted to commonly engage with corresponding claw means provided on the one output shaft means and on the input means in such a manner that the sliding clutch means may be shifted in sliding motion in the axial direction along the other output shaft means so as to selectively engage and disengage with either of the output shaft means and the input means.

Also, this invention provides an improved two-and-four wheel drive shifting system of the type including a differential gear unit, which comprises a pair of output shaft means extending opposedly from each other and mounted rotatably independently of each other, a differential gear means disposed intermediate the pair of output shaft means, an input gear means mounted concentrically and rotatably on a gear casing means of the differential gear means, and a sliding clutch means mounted slidably and rotatably on one of the pair of output shaft means, the sliding clutch means having engagement claw means adapted to commonly engage with corresponding claw means provided on the differential gear casing means and on the input means in such a manner that the sliding clutch means may be shifted in sliding motion in the axial direction along the one output shaft means so as to selectively engage and disengage with either of the claw means on the differential gear casing means and the input means.

Additional features and advantages of the invention will now become more apparent to those skilled in the art upon consideration of the following detailed description of a preferred embodiment exemplifying the best mode of carrying out the invention as presently perceived. The detailed description refers particularly to the accompanying drawings, in which like parts are designated by like reference numerals.

BRIEF DESCRIPTION OF THE DRAWING

In the drawings;

FIGS. 6 and 7 are longitudinal cross-sectional views showing the typical general constructions of a conventional two-and-four wheel drive shifting system.

DETAILED DESCRIPTION OF A PREFERRED EMBODIMENT

The present invention will now be explained in concrete terms by way of a preferred embodiment thereof.

Figure 1:
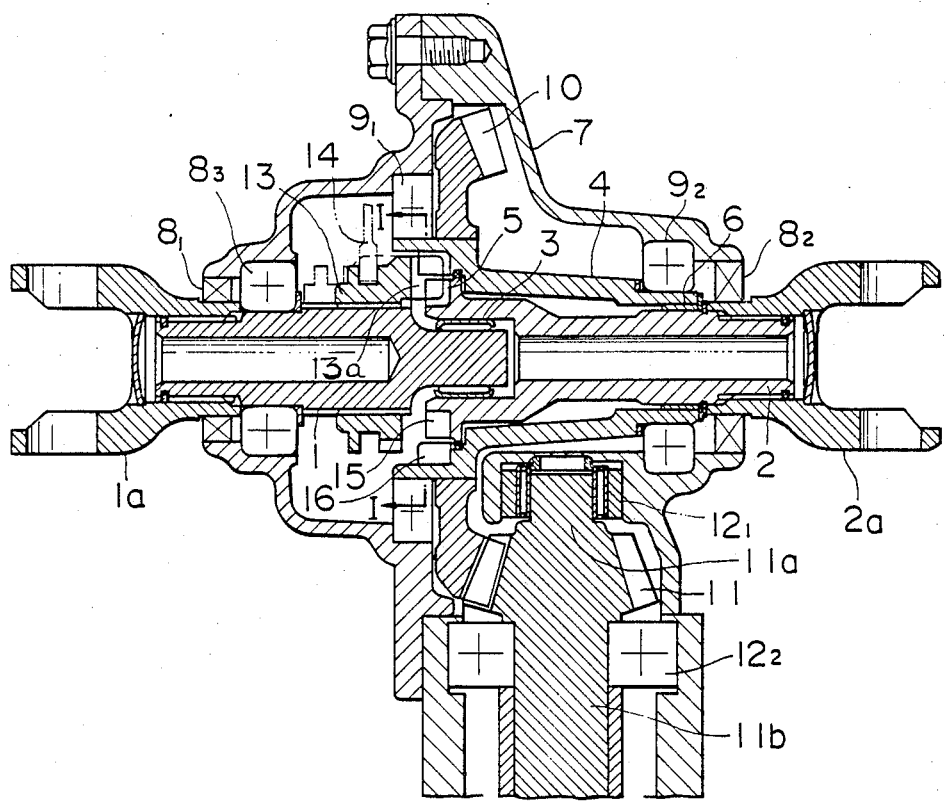
FIG. 1 is a general longitudinal cross-sectional view showing a first preferred embodiment of a two-and-four wheel drive shifting system according to the present invention.
Figure 2:
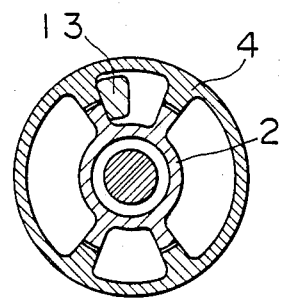
FIG. 2 is a transversal cross-sectional view taken generally in accordance with the line I—I in FIG. 1.

Referring to FIGS. 1 and 2, there is shown generally in longitudinal and transversal cross sections the general construction of an improved two-and-four wheel drive shifting system according to the invention, wherein there are provided a pair of front drive shafts 1 and 2 disposed opposedly with their ends being in a mutually nested relationship with each other by way of a bearing 3 and adapted to operatively mount left and right front wheels thereon, and a drive sleeve 4 serving as an input shaft mounted rotatably upon the outer circumference of front axle 2 by way of anti-friction bearings 5, 6.

Figure 5:
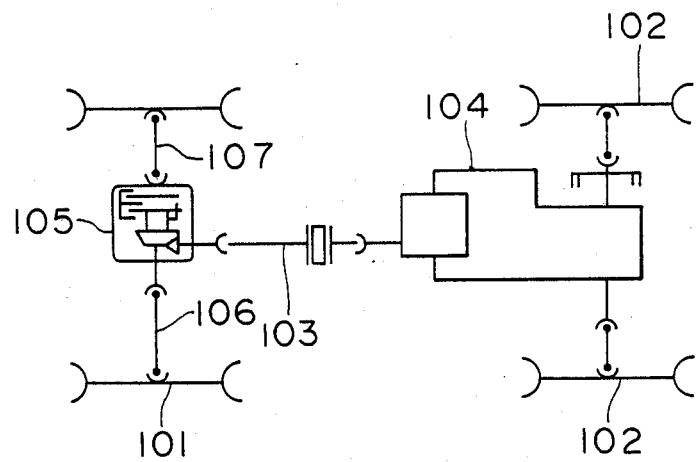
Figure 6:
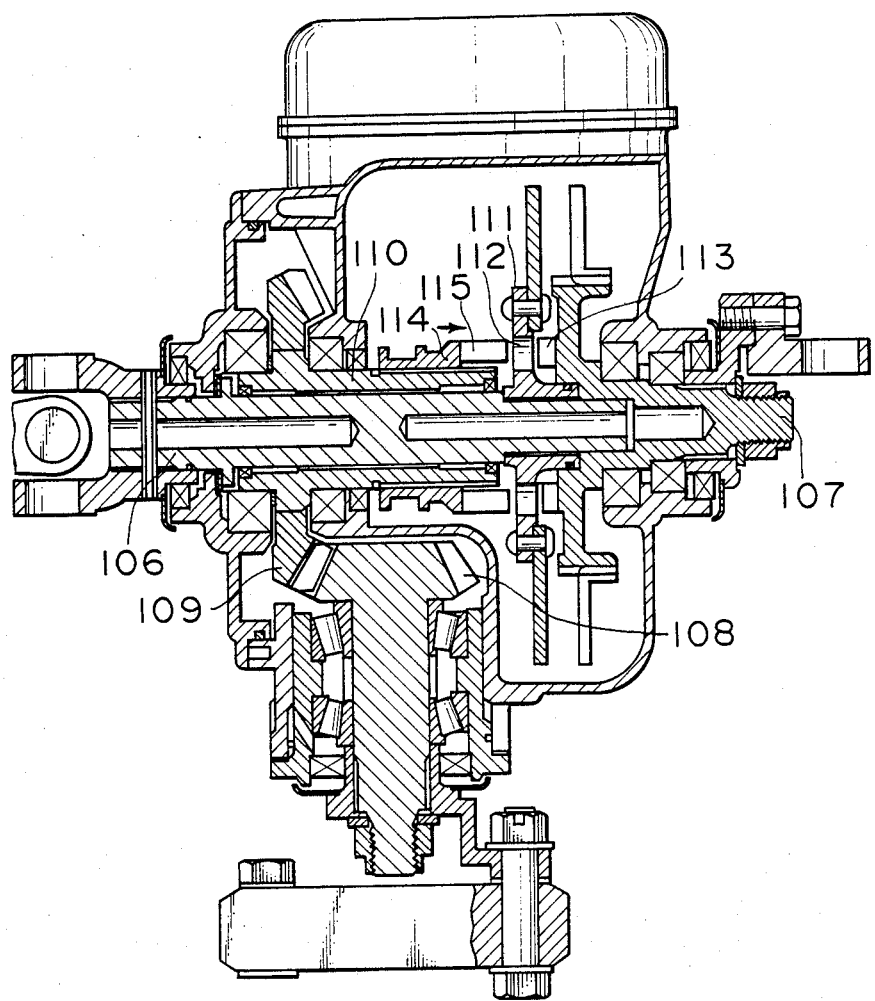

Mounted on outer ends near the front wheel ends of the front drive shafts 1 and 2 are joint or coupling halves 1a and 2a, respectively, these coupling halves 1a, 2a being connected operatively with the corresponding coupling halves mounted on the left and right front drive axles 107 shown schematically in FIG. 5, respectively. The coupling halves 1a and 2a are mounted rotatably at their base portions by way of bearings $8_1$ and $8_2$. There is also shown a bearing $8_3$ which is adapted to rotatably mount the front drive shaft 1 upon a gear casing 7. The sleeve 4 is rotatably mounted upon gear casing 7 by way of bearings $9_1$ and $9_2$.

There is also provided a large-diametered reduction gear 10 on the outer circumference of this sleeve 4 in such a manner that this large reduction gear 10 meshes with a small-diametered reduction gear 11 so that the driving power is transmitted accordingly. It is also arranged that this small reduction gear 11 is held in operative position with a leading projection 11a and a shaft portion 11b being mounted rotatably upon the gear casing 7 by way of bearings $12_1$ and $12_2$ so that the driving power from the engine may be transmitted to shaft portion 11b by the propeller shaft not shown. There is shown a dog or sliding clutch 13 which is spline-coupled upon the front drive shaft 1 and adapted to move in sliding motion in the axial direction of the shaft 1 by way of a shifting fork 14. This dog clutch is arranged in an operative relationship such that when it is shifted in sliding motion along the axis of the shaft 1 toward the right as viewed in FIG. 1, the claws or engaging teeth 13a thereof may come into engagement with corresponding claws or engaging teeth 15 and 16 provided on the front drive shaft 1 and the sleeve 4, respectively.

The operation of the two-and-four wheel drive shifting system constructed as noted above according to the invention will now be described as follows.

When in the normal rear wheel drive, or two-wheel drive by the rear wheels of the vehicle, the engine power is transmitted to the small reduction gear 11 from the propeller shaft so that it is driven in rotation, and the drive sleeve 4 may rotate loosely together with the large reduction gear 10, thus the vehicle is driven by the rear wheels only, while leaving the front wheels rotatable with no drive thereto.

For shifting the driving position of the vehicle to the four-wheel drive, the driver of the vehicle may have the shifting fork 14 shifted in position by using a shift lever so that the dog clutch 13 will be shifted to a position to engage with the claws 16 on the drive sleeve 4 and the claws 15 on the front drive shaft 2, respectively. With this shifting action, the rotating motion of the drive sleeve 4 is then transmitted to the front drive axles 1 and 2 through the dog clutch 13, thus causing the vehicle to be driven in the four-wheel drive position.

Figure 3:
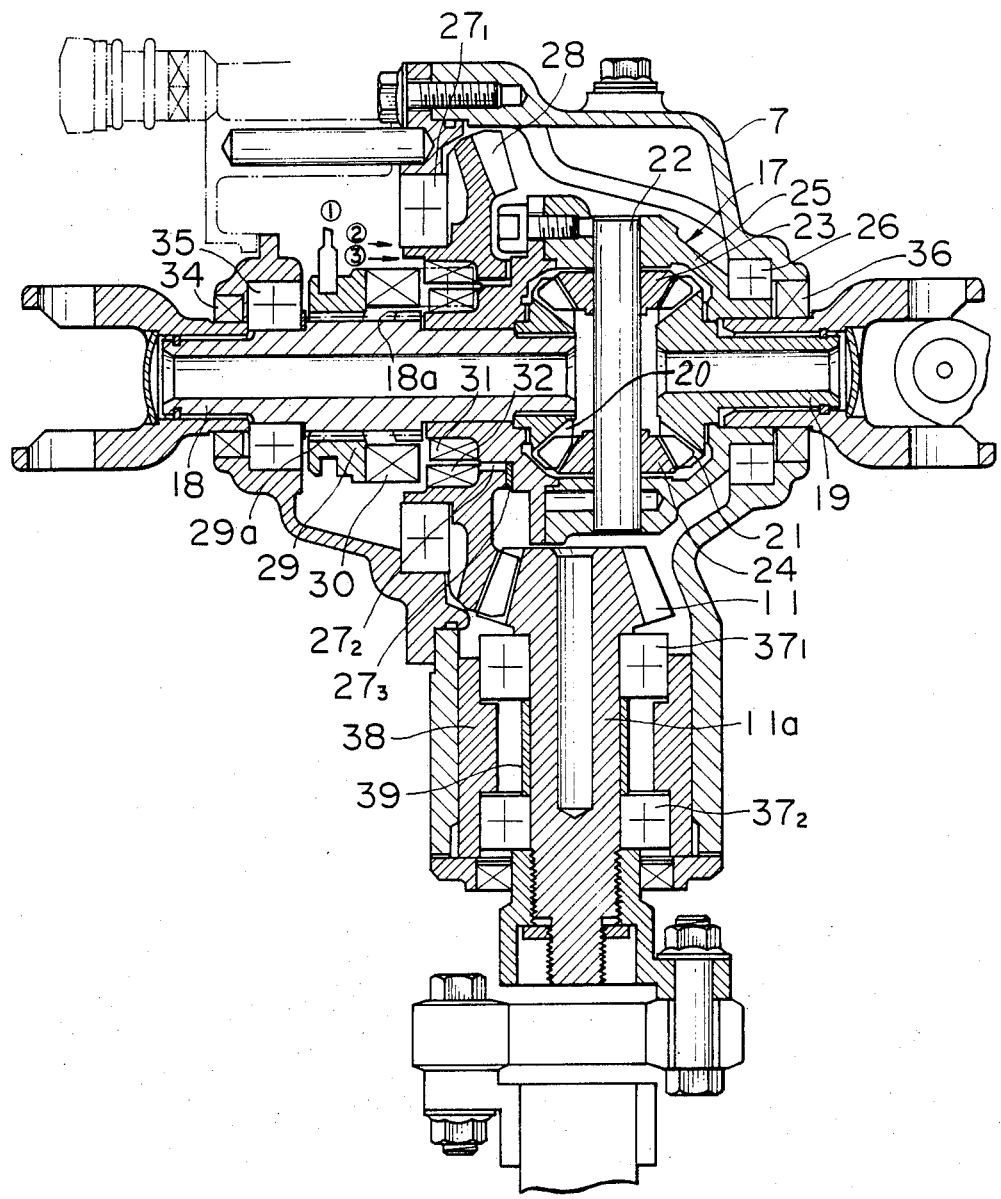
FIG. 3 is a longitudinal cross-sectional view showing the general construction of an improved two-and-four wheel drive shifting system by way of a second preferred embodiment of the invention.
Figure 4:
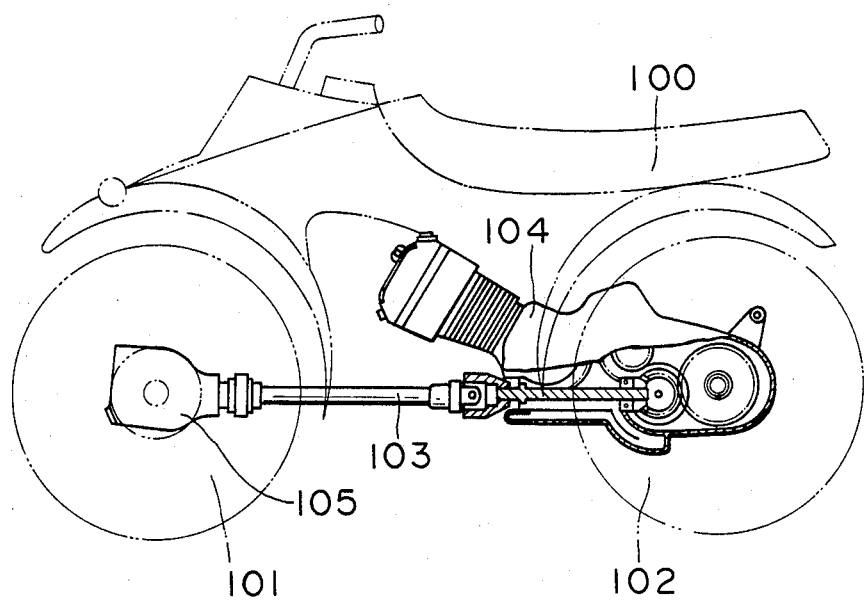
FIGS. 4 and 5 are a schematic general view and a lay-out scheme showing the general construction of a typical conventional four-wheel drive system for use with a saddle-type off-road vehicle and the general concept of power train of the same system, respectively.

FIG. 3 shows by way of another embodiment a general construction of an improved two-and-four wheel drive shifting system which is equipped with a differential lock mechanism, in which like parts are designated by like reference numerals, with the explanation of these parts omitted accordingly.

There is shown a differential gear unit 17 which is disposed between a front drive or output shafts 18 and 19. It is seen that this differential gear unit 17 comprises large or major differential gears 20, 21 mounted respectively on the front drive shaft 18, 19, a pair of small or minor differential gears 23, 24 mounted rotatably on a minor differential gear shaft 22 and adapted to constantly engage operatively with the major differential gears 20, 21, and a differential gear casing 25 mounted rotatably together with the front drive shafts 18, 19 and mounting rigidly the minor differential gear shaft 22. This differential gear casing 25 is held at its one end upon a main gear casing 7 through a bearing 26, and mounted at its other end upon the main gear casing 7 together with the large reduction gear by a bearing $27_1$.

There is also provided a large-sized reduction gear 28 which is mounted rotatably intermediate the main gear casing 7 and the differential gear box 25 by way of the bearings $27_1$, $27_2$ and $27_3$, and which is adapted to engage in a mutual meshing relationship with the small reduction gear 11. The driving power from the propeller shaft, not shown, is transmitted to this small reduction gear 11 by way of its shaft portion 11a.

A dog clutch 29 is also provided, which is formed with splines 29a in its inner circumferential face and with a plurality of claws or engagement teeth 30 projecting axially outwardly in the side thereof facing the large reduction gear 28. This dog clutch 29 is mounted slidably upon the front drive shaft 18. More specifically, there is provided splines 18a only partially on the outer circumference of the front drive shaft 18 leaving a certain length of circumferential portion 18b thereof unsplined to such an extent that the dog clutch 29 may rotate loosely out of engagement with the splines 18a. When the splines 29a on the dog clutch 29 comes into engagement with the splines 18a on the front drive shaft 18, the dog clutch 29 may rotate as a unit with the front drive shaft 18.

On the other hand, there are provided a plurality of claws or engagement teeth 31 and 32 on the sides of the differential gear box 25 and the large reduction gear 28 opposing the plurality of claws 30 of the dog clutch 29, respectively, which claws 31, 32 are adapted to selectively come into operative engagement with the claws 30 provided on the dog clutch 29. The dog clutch 29 is designed to be shifted slidably by the manual operation of the shift fork 14 to its working positions. At the first stage, the dog clutch 29 is put in a position where it may rotate loosely with respect to the front drive shaft 18. Then at the second stage, the dog clutch 29 will occupy a common engagement position with the both claws 31 and 32 on the differential gear box 25 and the large reduction gear 28, respectively, with its splines 29a sliding out of engagement with the splines 18a on the front drive shaft 18. At the third stage, the dog clutch 29 will be in a position to have its splines 29a put into engagement with the splines 18a on the front drive shaft 18, while its claws 30 remains in operative engagement with the both claws 31 and 32 of the differential gear box 25 and the large reduction gear 28, respectively. More specifically, there is provided a slight difference in the depths of projection of these claws or theeth 31 and 32 of the differential gear box 25 and the large reduction gear 28 towards the dog clutch 29 in such a manner that the dog clutch 29 may initially come into engagement with the claws 32 of the large reduction gear 28, and subsequently come into engagement with the claws 31 of the differential gear box 25. There are also shown bearings 34, 35 and 36 which serve to rotatably mount the front drive shafts 18, 19 upon the main gear casing 7. Bearings $37_1$, $37_2$ are provided to rotatably mount the shaft portion 11a of the small reduction gear. These bearings are held in position upon the casing 7 by way of a spacer 38 and with a certain space between the two bearings by way of a sleeve 39.

In operation, the two-and-four wheel drive shifting system with the construction as stated hereinbefore is utilized as follows.

Firstly, when it is desired to operate a vehicle in the two-wheel drive position, a power train is selected such that the engine's driving power from the propeller shaft is transmitted to the small reduction gear 11 with which the large reduction gear 28 engages in a position of loose rotation. With this route of power transmission, the vehicle will run on its rear two wheels alone, while the front wheels rotate with no tractive motion.

Then, when the four-wheel drive is desired, the shift fork is manipulated so that the dog clutch 29 may come into the second stage of engagement in the following manner.

With this shifting operation, the claws 30 of the dog clutch 29 will come into operative engagement commonly with the claws 31 on the differential gear box 25 and the claws 32 of the large reduction gear 28, respectively. In this position of engagement, the differential gear box 25 may rotate as a unit with the large reduction gear 28, and the driving power of the engine is then transmitted through the route of the small differential gear shaft 22 to the small differential gears 23, 24 to the large differential gears 20, 21, eventually having the front left and right wheels driven by way of the front drive shafts 18 and 19, respectively. In this driving position, the front wheels are operatively connected through the differential gear unit 17 to the power transmission train, while allowing a differential motion during its tractive rotating operation when required.

On the other hand, when it is desired to put the differential gear unit 17 in the locking operating position, the shift fork 14 is manually shifted to a third operating position.

In this locking operating position, the dog clutch 29 has its claws 30 put into common engagement with the claws 31 and the claws 32 of the differential gear box 25 and the large reduction gear 28, while having its splines 29a engaged in meshing with the splines 18a of the front drive shaft 18. In this position, the differential gear box 25 and the front drive shaft 18 will rotate together with the large reduction gear 28, with the small differential gears 23, 24 revolving commonly with the differential gear box 25 being locked from motion, thus having the front drive shafts 18, 19 driven in rotation together. As a consequence, the front wheels may be driven commonly in tractive motion while putting their differential gear unit 17 in the locking position during the four-wheel driving operation of the vehicle.

Incidentally, it is of course possible in practice to employ a similar lock mechanism also in the rear wheel axle so that the rear wheels may be put in a locking state concurrently with or independently from the front wheels.

The two-and-four wheel drive shifting system having the construction according to the present invention presents various advantages as follows.

By virtue of the employment of the clutch of slide type on the side of the output shaft having a relatively low revolutionary motion, it is possible in practice to make a substantial reduction of shock loads and noises in the shifting operations of the drive shifting system.

Thanks to the provision of a relatively short stroke of engagement of the slide clutch, it is feasible to have the operating mechanism simplified and have a relatively small number of parts required, accordingly.

In addition, the present invention makes it possible to incorporate the two-and-four wheel drive shifting system intermediate the two opposed output axles, irrespective of whether or not there is employed a differential gear unit in the drive system of a vehicle.

Furthermore, the present invention may provide differential locking with the improved construction of the differential gear unit employed.

While the present invention has been described in detail by way of specific preferred embodiments thereof, it is to be understood that the present invention is not intended to be restricted to the details of the specific constructions shown in the preferred embodiments, but to the contrary, the present invention can of course be practiced in many other arrangements to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A two-and-four wheel drive shifting system, wherein there is provided, in combination, a pair of output shaft means extending opposedly from each other and mounted rotatably independently of each other about an axis, a differential gear means disposed intermediate said pair of output shaft means, an input gear means mounted rotatably on a gear casing means of said differential gear means, first claw means provided on a part of an outer surface of said differential gear casing means, said first claw means being secured to said outer surface by first securing means extending in the direction of said axis, second claw means provided on a part of an inner surface of said input gear means, said second claw means being secured to said inner surface by second securing means extending in the direction of said axis, said second claw means being spaced outwardly from said first claw means and being concentric therewith, and a sliding clutch means mounted slidably on one of said pair of output shaft means, said sliding clutch means having engagement claw means adapted to commonly engage with said first and second claw means provided on said differential gear casing means and on said input gear means, said sliding clutch means and output shaft means having spline means located in the inner circumference of said sliding clutch means and located on a portion of the outer circumference of said output shaft means so that said sliding clutch means and said output shaft means may engage slidably with each other, and wherein there are provided three shifting stages which may be selected by the shifting motion of said sliding clutch means, namely, an operating stage wherein said sliding clutch means is out of engagement with said first and second claw means of said differential gear casing means and said input gear means which is rotating freely, another operating stage wherein said sliding clutch means is selectively shifting into operative engagement with said first and second claw means of said differential gear casing means and said input gear means only, and a further operating stage wherein said sliding clutch means is shifted into operative engagement with said first and second claw means of said differential gear casing means and said input gear means and also the spline means in said sliding clutch means is operatively connected with the spline means on said output shaft means by sliding said sliding clutch means further after said engagement claw means is engaged with said first and second claw means of said differential gear casing means and said input gear means, said first claw means and second claw means being made to have the length thereof in a direction along said axis larger than that in a radial direction.

2. The two-and-four-wheel drive shifting system as claimed in claim 1, wherein said pair of output shaft means is provided with a coupling means on each output shaft adapted to be connected operatively with a drive axle for a vehicle wheel.

* * * * *